(12) United States Patent
Dahl

(10) Patent No.: US 6,345,130 B1
(45) Date of Patent: Feb. 5, 2002

(54) METHOD AND ARRANGEMENT FOR ENSURING QUALITY DURING SCANNING/COPYING OF IMAGES/DOCUMENTS

(75) Inventor: Magnus Dahl, Upplands Väsby (SE)

(73) Assignee: Ralip International AB, Vasby (SE)

( * ) Notice: Subject to any disclaimer, the term of this patent is extended or adjusted under 35 U.S.C. 154(b) by 0 days.

(21) Appl. No.: 09/242,688

(22) PCT Filed: Aug. 28, 1997

(86) PCT No.: PCT/SE97/01443

§ 371 Date: Feb. 23, 1999

§ 102(e) Date: Feb. 23, 1999

(87) PCT Pub. No.: WO98/09427

PCT Pub. Date: Mar. 5, 1998

(30) Foreign Application Priority Data

Aug. 28, 1996 (SE) .............................. 9603138

(51) Int. Cl.[7] .................................. G06K 9/36
(52) U.S. Cl. ...................... 382/286; 382/317; 382/309; 358/504
(58) Field of Search ................ 382/286, 317, 382/318, 312, 309; 358/296, 403, 401, 504; 356/372, 374

(56) References Cited

U.S. PATENT DOCUMENTS

| | | | |
|---|---|---|---|
| 5,073,953 A | 12/1991 | Westdijk | 382/176 |
| 5,159,667 A | 10/1992 | Borrey et al. | 395/148 |
| 5,235,652 A | * 8/1993 | Nally | 382/57 |
| 5,365,310 A | 11/1994 | Jenkins et al. | 355/202 |
| 5,510,896 A | 4/1996 | Wafler | 358/296 |
| 5,754,308 A | * 5/1998 | Lopresti et al. | 358/403 |
| 5,930,411 A | * 7/1999 | Kojima et al. | 382/312 |

FOREIGN PATENT DOCUMENTS

| | | |
|---|---|---|
| DE | 44 37 385 A1 | 4/1995 |
| EP | 0 697 677 A2 | 2/1996 |
| WO | 95/12271 | 5/1995 |

* cited by examiner

Primary Examiner—Leo Boudreau
Assistant Examiner—Yosef Kassa
(74) Attorney, Agent, or Firm—Dykema Gossett PLLC

(57) ABSTRACT

The present invention relates to an arrangement and a method for ensuring quality during scanning/copying of images/documents. The method includes the steps of feeding in the page(s) that are to be scanned/copied. Thereafter, a first measurement of outer characteristics is performed with respect to skew, double-feeding/overlapping, deviating shape, and geometric deformation for calculating a first quality measure $Q_1$. Thereafter, the first quality measure $Q_1$ is compared with a predetermined first quality limit $Q+_1$. If $Q_1 \geq Q+_1$, then an automatic adjustment is performed in the form of a geometric transformation in order to improve the first quality measure $Q_1$. Thereafter, the contents of the page are analyzed with respect to structure and objects in order to calculate a second quality measure $Q_2$, which is compared with a predetermined second quality limit $Q+_2$. If $Q_2 \geq Q+_2$, then image improvement methods are performed on each identified object. Thereafter, an information analysis of each page is performed, followed by a comparison with pre-defined form/document types for calculating a third quality measure $Q_3$, which is compared with a predetermined third quality limit $Q+_3$. If $Q_3 \geq Q_3$, then a fourth quality measure Q is calculated, which is an overall quality measure that is compared with a predetermined fourth quality limit $Q+$. If $Q \geq Q+$, then pre-processing is performed in order to achieve a correct output format, depending on pre-defined information about the printer/output unit.

8 Claims, 3 Drawing Sheets

METHOD AND ARRANGEMENT FOR ENSURING QUALITY DURING SCANNING/COPYING OF IMAGES/DOCUMENTS

FIELD OF THE INVENTION

The present invention relates to a method for ensuring quality during the scanning and/or copying of images and/or documents. The present invention also relates to an arrangement for carrying out the method according to the invention.

DESCRIPTION OF THE RELATED ART

WO-A1-95/12271 describes a method for scanning documents in which the skew and size of the document to be scanned are checked. Depending on the result, the scanning signal is modified in order to compensate for the skew.

U.S. Pat. No. 5,073,953 describes a system for automatic segmentation of a scanned document in order to separate areas with different types of information in the document, for example; text, images, etc. The document is subdivided into a number of partial images that are then classified. In order to increase the speed of the system, the number of classes and/or partial images is chosen to be greater than the number of information types that are to be distinguished.

U.S. Pat. No. 5,159,667 shows an automatic identification method for scanning documents. The method relies on recognizing different global characteristics of different documents and/or forms and compares this information with a database of known document types. The system classifies different parts of the document based on that information.

U.S. Pat. No. 5,510,896 describes a digital copier including an automatic copy quality correction and calibration method. The correction and calibration method is performed using a known test original. The result of the correction and calibration method is to give a basic quality to the digital copier.

Common to the abovedisclosed methods for scanning documents is that they only solve one or a few of the many problems one encounters when scanning and/or copying images and/or documents.

SUMMARY OF THE INVENTION

The object of the present invention is to provide a method for ensuring quality during the scanning/copying of images/documents, as well as an arrangement for carrying out the method. The purpose of the invention is to ensure the quality of the entire result of the scanning/copying process. The method for ensuring quality is performed every time a document is being fed in, making use of each separate document, not a known test original. This will improve the quality further.

These objects are achieved by a method that includes a number of is steps, the method starting by the page(s) to be scanned and/or copied being fed in. Thereafter, parameters for outer characteristics concerning skew, double feeding/overlapping, deviating shape and geometric deformation are measured in order to calculate a first quality measure, $Q_1$, which represents outer quality. Thereafter, the first quality measure $Q_1$ is compared with a predetermined quality limit $Q+_1$. If the quality limit has not been reached, that is, if $Q_1<Q+_1$, then a warning is sent out in order to perform re-feeding. If, however, $Q_1 \geq Q+_1$ then the outer quality is automatically adjusted through geometric transformation in order to improve the first quality measure $Q_1$. The next step is to perform an analysis of the contents of the page with respect to structure and objects in order to calculate a second quality measure, $Q_2$, which represents inner quality. Thereafter, the second quality measure $Q_2$ is compared with a predetermined second quality limit $Q+_2$. If the quality limit has not been reached, that is, if $Q_2<Q+$, then a warning is sent out in order to perform re-feeding. If, however, $Q_2 \geq Q+_2$, then image improvement methods are performed on each identified object. An information analysis is then performed on each page, followed by a comparison with pre-defined forms and/or document types in order to calculate a third quality measure, $Q_3$, which represents the information/context quality. The next step is to compare the third quality measure $Q_3$ with a pre-determined third quality limit $Q+_3$. If the quality limit has not been reached, that is, if $Q_3<Q+_3$, then a warning indicating document error is sent out. If, however, $Q_3 \geq Q+_3$, then a fourth quality measure, Q, is calculated, which is a weighted combination of the quality measures $Q_1$–$Q_3$. The quality measure Q is compared with a pre-determined fourth quality limit, Q+, which represents an overall quality limit. If Q<Q+, then a warning is sent out indicating insufficient quality. If, however, Q$\geq$Q+, then pre-processing is performed in order to obtain the correct output format, depending on pre-defined information about the printer/output unit.

The present invention also relates to an arrangement for ensuring quality during the scanning/copying of images/documents, the arrangement including an interface/communications logic unit that is connected to and communicates with an image input arrangement and with an image output arrangement. Additionally, the arrangement includes a control and monitoring unit connected to the interface communications logic unit. An image memory unit for storing image information is connected to the interface/communications logic unit. The arrangement also includes a device, connected to the control and monitoring unit and to the image memory unit, for measuring outer characteristics concerning skew, double feeding/overlapping, deviating shapes and geometric deformation. These parameters/measures are used by the control and monitoring unit to calculate a first quality measure, $Q_1$, which represents outer quality. Connected to the control and monitoring unit, the image memory unit and the device for measuring outer characteristics, is a device for automatically performing an adjustment in the form of geometric transformation in order to improve the first quality measure $Q_1$. The arrangement also includes an analysis device that is connected to the control and monitoring unit, the image memory unit and the device for automatic adjustment. The analysis device analyzes the contents of the page with respect to structure and objects. This analysis is used by the control and monitoring unit to calculate a second quality measure, $Q_2$, which represents inner quality. Connected to the control and monitoring unit, the image memory unit, and the analysis device, is a device for performing image improvement methods on each identified object. The arrangement also includes a device, connected to the control and monitoring unit, the image memory unit, and the image improvement device, for performing an information analysis of each page. The information analysis is carried out relative to predefined form and document types. The information analysis is used by the control and monitoring unit to calculate a third quality measure, $Q_3$, which represents information and context quality. Connected to the control and monitoring unit, the image memory unit and the information analysis device is a device for performing pre-processing in order to obtain a correct output format depending on predefined information about a printer/output unit connected to the arrangement.

The invention will be defined in greater detail below in connection with the drawings.

BRIEF DESCRIPTIONS OF THE DRAWINGS

DETAILED DESCRIPTION OF EMBODIMENTS

Figure 1:
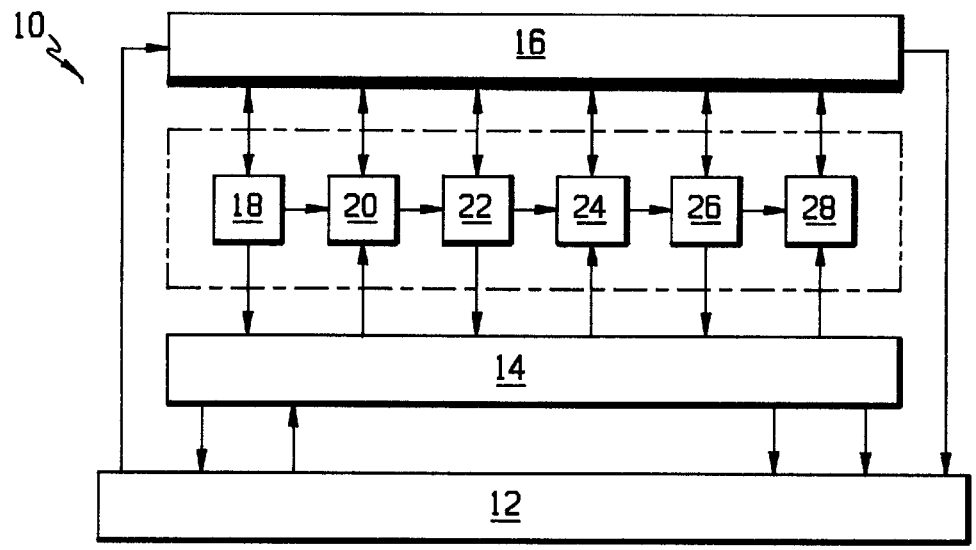
FIG. 1 shows a block diagram of an arrangement according to the present invention for ensuring quality during the scanning/copying of images/documents.

FIG. 1 shows a block diagram of an arrangement 10 for ensuring quality during the scanning/copying of images/documents. The arrangement 10 includes an interface/communications logic unit 12 that is connected to an image input arrangement and an image output arrangement (not shown in FIG. 1 because they are not included in the arrangement 10). The interface/communications logic unit 12 may, for example, be a PCI-bus or an ISA-bus. The arrangement 10 also includes a control and monitoring unit 14 that, among other things, is connected to the interface/communications logic unit 12. The control and monitoring unit 14 is the primary logic unit in the arrangement 10 and it collects input data and measurement data from the various sub-units in the arrangement 10, Connected to the interface/communications unit 12 is an image memory unit 16 for storing image information. The image memory unit 16 may, for example, be a memory with a memory capacity of 8–64 megabytes. The arrangement 10 includes six different sub-units, of which the first is a device 18 for measuring outer characteristics, which comprises the first quality assurance step. The device 18 is connected to the control and monitoring unit 14 and to the image memory unit 16 and measures parameters (outer characteristics) concerning skew, double-feeding and overlapping, deviating shape and geometric deformation. The purpose is to avoid the worsening of quality caused by the paper transport. Measured parameters are shape (the outer border line and curvature of the page), lengthwise running lines (dust), and lengthwise and transverse lines/structures (geometric deformation). The control and monitoring unit 14 uses these parameters/measures to calculate a first quality measure, $Q_1$, which represents the outer quality. This first quality measure $Q_1$ is compared by the control and monitoring unit 14 with a pre-determined first quality limit, $Q+_1$, and, if $Q_1<Q+_1$, then a warning is sent out indicating re-feeding, since this means that the outer quality has not reached the quality limit $Q+_1$, which may be entered, for example, by the user. If, however, $Q_1=Q+_1$, then an automatic adjustment is carried out in the form of a geometric transformation in order to improve the first quality measure $Q_1$. This is done by a device 20 that is connected to the control and monitoring unit 14, the image memory unit 16, and the device 18 for measuring outer characteristics. Geometric transformation involves, in the simpler case, global affine transformation (the coordinate system is translated using a vector addition and is also rotated, scaled, etc. with a matrix multiplication) and, in the more advanced case, rubber-sheet transformation (the contents of the is vector and the matrix are functions of the image coordinates instead of being constant over the entire image). The arrangement 10 also includes a device 22, which is connected to the control and monitoring unit 14, the image memory unit 16, and the adjustment device 20, for analyzing the contents of the page with respect to structure and objects, This is done primarily in two steps; first a legibility analysis and then a segmentation. The legibility analysis is a type of spatial frequency analysis that measures whether sufficient resolution has been used or not. The spatial frequency analysis may, for example, comprise Fourier analysis. Segmentation is carried out in order to enable a subsequent special processing controlled by the contents of the page, that is, each object on the page can be processed separately. In the simpler case, the page may, for example, be a product description with text on a toned or colored background and with a delimited color photograph somewhere on the page. The result of the segmentation is stored in the form of segmentation information in the vector ImSegm=$\{O_1, G_1, T_1; O_2, G_2, T_2; \ldots ; O_n, G_n, T_n\}$ where $O_i$ is object i; $G_i$ is a two-dimensional curve that makes up the border line for the object $O_i$; and $T_i$, is the character class of the object $O_i$. Usually, the user defines different character classes, which may, for example, be "text region," "photograph," "graphics" and "raster." The analysis performed by the device 22 is used by the control and monitoring unit 14 in order to calculate a second quality measure, $Q_2$, which represents inner quality. The control and monitoring unit 14 compares this second quality measure $Q_2$ with a pre-determined second quality limit $Q+_2$ and if $Q_2<Q+_2$, then a warning is sent out indicating re-feeding. The control and monitoring unit 14 gives a warning or stops if it cannot distinguish between different character classes or if the complexity in ImSegm is too large according to the set value for $Q+_2$. The complexity in ImSegm can be too great as a result of too great complexity in the image, for example, if there are many overlapping objects with different character classes, or when the border lines of the objects are too complicated. If $Q_2 \geq Q+_2$, then the device 24 carries out image improvement methods on each identified object $O_i$. The device 24, is connected to the control and monitoring unit 14, the image memory unit 16, and the analysis device 22. Given the segmentation information ImSegm, each object $O_i$ can be processed using image improvement methods that are specially designed for the respective information classes. Examples of this are optimization for OCR reading in the case of text regions, preservation of photographic images, etc. The arrangement 10 also includes a device 26 that is connected to the control and monitoring unit 14, the image memory unit 16 and the image improvement device 24, in order to perform an information analysis of each page. The measurement that is carried out involves the characteristics in each individual page in order to identify it relative to pre-defined form and document types. The analysis is used by the control and monitoring unit 14 for comparison with pre-defined form and document types in order to calculate a third quality measure, $Q_3$, which represents the quality of the information and context. The control and monitoring unit 14 compares the third quality measure $Q_3$ with a pre-determined third quality limit, $Q+_3$, and if $Q_3<Q+_3$, then a warning is sent out indicating document error. The control and monitoring unit 14 then gives a warning or stops if pages are missing or lie in the wrong order relative to predefined form and document types. If $Q_3 \geq Q+_3$, then the control and monitoring unit 14 calculates a fourth quality measure, Q, which is an overall quality measure. The control and monitoring unit 14 rejects (gives a warning or stops) if $Q<Q+$, where $Q+$ is a pre-determined quality number (quality value), which is established by the system user. Q is a weighted combination of $Q_1$–$Q_3$. If $Q \geq Q+$, then the device 28 performs pre-processing in order to achieve the correct output format for the printer/output unit (not shown). The device 28 is connected to the control and monitoring unit 14, the image memory unit 16, and the information analysis device 26. Based on ImSegm and pre-determined information about the printer/output unit, optimal pre-processing is performed for the correct output format. Examples of these methods are rasterizing, compression, etc. The block diagram according to FIG. 1 shows one implementation that, for example, may be a card insertible into a PC. Another possible implementation can be an electronic card that is integrated into a scanner or printer with the interface occurring directly with the logic circuitry of the scanner or printer. The quality limits $Q+_1-Q+_3$ are inputted and set by the user of the arrangement Depending on the type of document, the user can make different demands on the quality, by inputting and setting different quality limits $Q+_1-Q+_3$.

Figure 2:
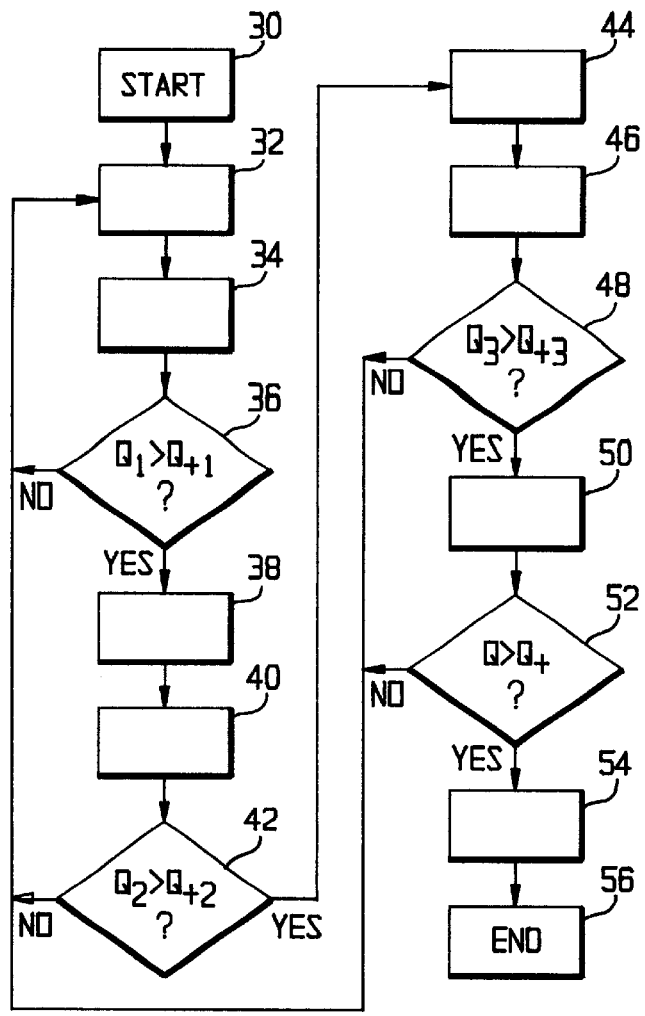
FIG. 2 shows a flowchart of a procedure according to the present invention for ensuring quality during the scanning/copying of images/documents.

FIG. 2 shows a flowchart of a procedure for ensuring quality during scanning/copying of images/documents according to the present invention. The flowchart begins with the block 30. Thereafter, at block 32, the stack to be scanned/copied is fed in. In this context it may be appropriate to define a number of common concepts in this area of technology. A stack consists of one or more documents read in sequentially. A document or form consists of one or more pages belonging to one and the same logical subdivision (information context). A page is the individual, captured, isolated image/unit, most often comprising a separate, two-dimensional matrix in the image memory, for example, a front or rear side of a sheet of paper or a photograph. At block 34, a first measurement is carried out of outer characteristics concerning skew, double-feeding/overlapping, deviating shape, and geometric deformation in order to calculate a first quality measure $Q_1$. The parameters that are measured are shape (the outer border line and curvature of the page), lengthwise running lines (dust), and lengthwise and transverse lines and structures (geometric deformation). In the next step, at block 36, the first quality measure $Q_1$ is compared with a pre-determined first quality limit $Q+_1$. If $Q_1<Q+_1$, then a warning is sent out indicating re-feeding, that is, the procedure is started over again from and including block 32. If, however, $Q_1 \geq Q+_1$, then one continues to the block 38, where an automatic adjustment is carried out in the form of a geometric transformation in order to improve the first quality measure $Q_1$. In the simpler case, geometric transformation involves only global affine transformation (the coordinate system is translated using a vector addition as well as being rotated and scaled, etc. with a matrix multiplication) and in the more advanced case rubber-sheet transformation (the contents of the vector and the matrix are functions of the image coordinates instead of remaining constant over the entire image). In the next step, at block 40, an analysis of the contents of the page is carried out with respect to structure and objects in order to calculate a second quality measure $Q_2$, which represents inner quality. This analysis is carried out in two steps: a legibility analysis and a segmentation. The legibility analysis is a type of spatial frequency analysis that measures whether sufficient resolution has been used or not. The spatial frequency analysis may, for example, comprise Fourier analysis. Segmentation is carried out in order to make possible subsequent special processing controlled by the contents of the page, that is, each object on the page can be processed individually. In the simpler case, the page may, for example, be a product description with text on a toned/colored background as well as a delimited color photograph somewhere on the page. The segmentation information is stored in the vector ImSegm=$\{O_1, G_1, T_1; O_2, G_2, T_2; \ldots, O_n, G_n, T_n\}$ where $O_i$ is object number i; $G_i$ is a two-dimensional curve that comprises the border line for the object $O_i$, and $T_I$, is the character class of the object $O_i$. In the next step, at block 42, the second quality measure $Q_2$ is compared with a pre-determined second quality limit $Q+_2$. If $Q_2<Q+_2$, a warning is sent out for re-feeding. If, however, $Q_2 \geq Q+_2$, then one continues to block 44, where image improvement methods are carried out on each identified object. Depending on the segmentation information ImSegm, each object can be processed using specially designed image improvement methods for the respective class of information, for example, optimization for OCR recording when it comes to text regions, preservation of photographic images, etc. In the next step, at block 46, an information analysis is performed on each page, followed by a comparison with pre-defined form/document types in order to calculate a third quality measure $Q_3$, which represents the information and context quality. Thereafter, at block 48, the third quality measure $Q_3$ is compared with a pre-determined third quality limit $Q+_3$. If $Q_3<Q+_3$, then a warning indicating document error is sent out If, however, $Q_3>Q+_3$, then a fourth quality measure Q is calculated at block 50, which represents an overall quality measure. Thereafter, at block 52, the fourth quality measure Q is compared with a pre-determined fourth quality limit $Q+$. If $Q<Q+$, then a warning is sent out indicating insufficient quality. If, however, $Q \geq Q+$, then pre-processing is performed at block 54 depending on pre-defined information about the printer/output unit in order to achieve a correct output format. Based on ImSegm and pre-defined information about the printer/output unit, an optimal pre-processing procedure is performed for the correct output format The procedures that are carried out are, for example, rasterizing, compression, etc. The method is completed at block 56. The method can also comprise a further step, wherein the quality limits $Q+_1-Q+_3$ are inputted and set by the user of the method. This step is preferably performed after block 30 and before block 32 in FIG. 2. Depending on the type of document, the user can make different demands on the quality, by inputting and setting different quality limits $Q+_1-Q+_3$.

Figure 3A:
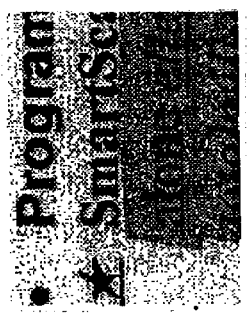
FIGS. 3–5 show three different examples of an original document, an original scanned in a "normal" scanner, and the original document scanned with the help of the arrangement according to the present invention.
Figure 3B:
Figure 3C:
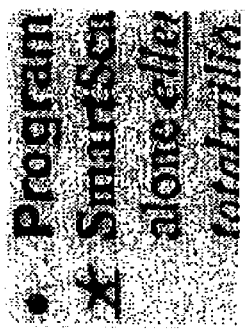

FIG. 3a shows an original in the form of a fax with highlighted text. The result after "normal scanning" is shown in FIG. 3b. One can see that the highlighted text is not legible. The result using the arrangement according to the invention is shown in FIG. 3c. In this case, one can read the highlighted text.

Figure 4C:
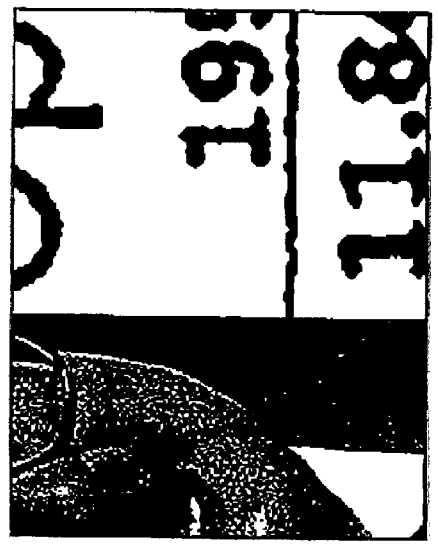
Figure 4B:
Figure 4A:
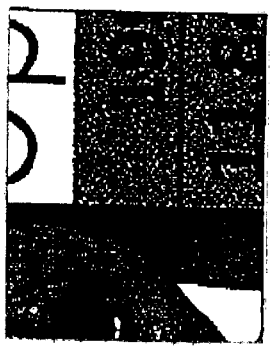

An original in the form of a portion of a strongly colored annual report is shown in FIG. 4a. The result after "normal scanning" is shown in FIG. 4b. One can see that the portrait is very unclear and the numbers are illegible. The result using the arrangement according to the present invention is shown in FIG. 4c. In this case, it is possible to read the numbers, and the portrait appears clearly.

Figure 5C:
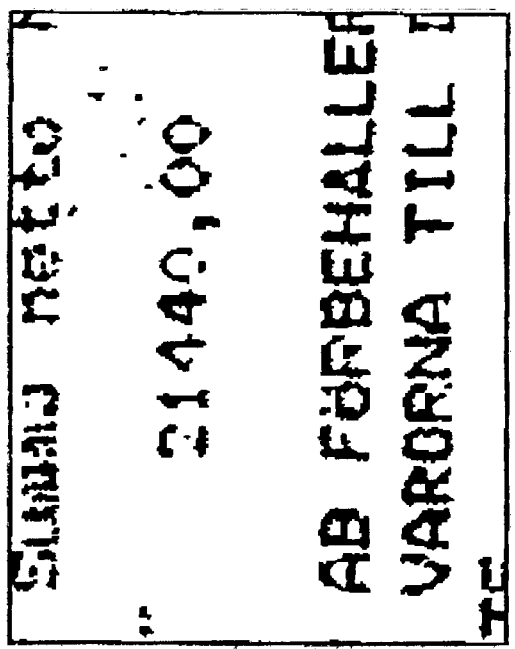
Figure 5B:
Figure 5A:
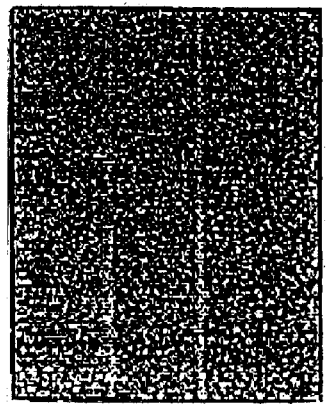

An original in the form of an invoice on self-copying paper is shown in FIG. 5a. The result after "normal scanning" is shown in FIG. 5b. In this case, the result is completely illegible. The result using the arrangement according to the present invention is shown in FIG. 5c. In this case, one can read the invoice even though the result is not altogether clear.

The invention is not limited to the illustrated embodiments but rather, several variations are possible within the scope of the following patent claims.

What is claimed is:

1. A method for ensuring quality during the scanning/copying of images/documents, the method comprising the steps:

feeding in the pages to be scanned/copied;

performing a first measurement of outer characteristics relating to skew, double-feeding/overlapping, deviating shape, and geometric deformation for calculating a first quality measure $Q_1$;

comparing the first quality measure $Q_1$ with a predetermined first quality limit $Q+_1$ and sending out a warning indicating re-feeding when $Q_1 < Q+_1$; and performing an automatic adjustment in the form of geometric transformation in order to improve the first quality measure $Q_1$ when $Q_1 \geq Q+_1$;

analyzing the contents of the page with respect to structure and objects for calculating a second quality measure $Q_2$;

comparing the second quality measure $Q_2$ with a predetermined second quality limit $Q+_2$ and sending out a warning indicating re-feeding when $Q_2 < Q+_2$;

performing image improvement methods on each identified object if $Q_2 \geq Q+_2$;

performing an information analysis on each page followed by a comparison with pre-defined form/document types for calculating a third quality measure $Q_3$;

comparing the third quality measure $Q_3$ with a predetermined third limit $Q+_3$ and sending out a warning indicating document error when $Q_3 < Q+_3$; and calculating a fourth quality measure Q, which is a weighted combination of the quality measures $Q_1$–$Q_3$ when $Q_3 \geq Q+_3$;

comparing the fourth quality measure Q with a predetermined fourth quality limit Q+ and sending out a warning indicating insufficient quality when $Q < Q+$; and performing pre-processing for achieving a correct output format depending on pre-defined information concerning the printer/output unit when $Q \geq Q+$, wherein Q+, $Q+_1$–$Q+_3$ are entered and set by the user.

2. A method according to claim 1 wherein the step of measuring outer characteristics includes the steps of:

measuring an outer border line and curvature of the page;

measuring lengthwise running lines; and measuring lengthwise and transverse running lines/structures.

3. A method according to claim 1, wherein the step of performing automatic adjustment in the form of geometric transformation includes the steps:

adjusting skew by means of translation and rotation; and performing a rubber-sheet transformation.

4. A method according to claim 1, wherein the step of performing an analysis of the contents of the page with respect to structure and objects includes the steps of:

performing a legibility analysis in the form of a spatial frequency analysis of the contents of the page to measure whether sufficient resolution has been used;

segmenting the contents of the page.

5. A method according to claim 1, wherein the step of performing an information analysis includes the steps:

performing a symbol identification; and/or comparing with pre-defined form/document types; and/or comparing the contents of the page with information tables that describe sets of form/document types.

6. A method according to claim 4, wherein the result of the segmentation of the contents of the page being stored in the form of a vector IS={$O_1$, $G_1$, $T_1$; $O_2$, $G_2$, $T_2$; . . . ; $O_n$, $G_n$, $T_n$} where $O_1$ is the object; $G_1$ is a two-dimensional curve that defines the border line for $O_1$; and $T_1$ is the character class of the object.

7. The arrangement for ensuring quality during scanning/copying of images/documents, comprising:

an interface/communications logical unit;

a control and monitoring unit connected to the interface/communications logic unit;

an image memory unit, connected to the interface/communications logic unit, for storing image information;

a measuring device connected to the control and monitoring unit and to the image memory unit for measuring outer characteristics relating to skew, double-feeding/overlapping, deviating shape, and geometric distortion/deformation, the measures being used by the control and monitoring unit for calculating a first quality measure $Q_1$;

an adjustment device connected to the control and monitoring unit, to the image memory and to the measuring device, for automatically performing an adjustment in the form of geometric transformation in order to improve the first quality measure $Q_1$;

an analysis device connected to the control and monitoring unit to the image memory unit and to the adjustment device, for analyzing the contents of the page with respect to structure and objects, the analysis being used by the control and monitoring unit to calculate a second quality measure $Q_2$;

an improvement device connected to the control and monitoring unit, to the image memory unit and to the analysis device for performing image improvement methods on each identified object;

an information analysis device connected to the control and monitoring unit, to the imagery memory unit and to the improvement device for performing an information analysis of each page, the analysis being used by the control and monitoring unit for comparison with pre-defined form/document types for calculating a third quality measure $Q_3$; and a pre-processing device connected to the control and monitoring unit, to the image memory unit and to the information analysis device for performing pre-processing for achieving a correct output format depending on pre-defined information about a printer/output unit connected to the arrangement, whereby the control and monitoring unit respectively compares the quality measures $Q_1$–$Q_3$ with respective by the user entered and set quality limits $Q+_1$–$Q+_3$.

8. The arrangement according to claim 7, wherein the control and monitoring unit uses the three quality measures $Q_1$–$Q_3$, for calculating a fourth quality measure, and the control and monitoring unit sends out a warning indicating whether any of the quality measures Q, $Q_1$–$Q_3$ is less than pre-determined quality limits Q+, $Q+_1$–$Q+_3$.

* * * * *